(12) United States Patent
Guenthner et al.

(10) Patent No.: US 10,301,530 B2
(45) Date of Patent: May 28, 2019

(54) SURFACE COATINGS, TREATMENTS, AND METHODS FOR REMOVAL OF MINERAL SCALE BY SELF-RELEASE

(71) Applicants: The United States as Represented by the Secretary of the Air Force, Washington, DC (US); Nano Hydrophobics, Inc., San Francisco, CA (US)

(72) Inventors: Andrew Guenthner, Lancaster, CA (US); Jeffrey Alston, Palmdale, CA (US); Peter H. Boyd, San Francisco, CA (US); Joseph M. Mabry, Lancaster, CA (US); Timothy W. Rost, Fremont, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/675,070

(22) Filed: Aug. 11, 2017

(65) Prior Publication Data
US 2017/0349807 A1    Dec. 7, 2017

Related U.S. Application Data

(63) Continuation of application No. 14/732,652, filed on Jun. 5, 2015, now Pat. No. 9,765,255.

(60) Provisional application No. 62/008,828, filed on Jun. 6, 2014.

(51) Int. Cl.
| | | |
|---|---|---|
| B05D 1/36 | (2006.01) | |
| C09K 8/52 | (2006.01) | |
| C08L 33/12 | (2006.01) | |
| C09D 7/20 | (2018.01) | |
| C09D 5/00 | (2006.01) | |
| C09D 133/12 | (2006.01) | |
| C09D 183/08 | (2006.01) | |
| C08L 83/00 | (2006.01) | |
| C08L 25/06 | (2006.01) | |
| C08L 81/06 | (2006.01) | |
| C08L 33/20 | (2006.01) | |
| C08L 33/08 | (2006.01) | |
| C08L 83/08 | (2006.01) | |
| B05D 1/38 | (2006.01) | |
| C08G 77/04 | (2006.01) | |
| C08G 77/24 | (2006.01) | |

(52) U.S. Cl.
CPC .............. *C09K 8/52* (2013.01); *C08L 33/12* (2013.01); *C08L 83/00* (2013.01); *C09D 5/00* (2013.01); *C09D 7/20* (2018.01); *C09D 133/12* (2013.01); *C09D 183/08* (2013.01); *B05D 1/36* (2013.01); *B05D 1/38* (2013.01); *C08G 77/045* (2013.01); *C08G 77/24* (2013.01); *C08L 25/06* (2013.01); *C08L 33/08* (2013.01); *C08L 33/20* (2013.01); *C08L 81/06* (2013.01); *C08L 83/08* (2013.01)

(58) Field of Classification Search
CPC ...... C09D 183/08; C09D 133/12; B05D 1/38; B05D 1/36
See application file for complete search history.

(56) References Cited

U.S. PATENT DOCUMENTS

| | | | |
|---|---|---|---|
| 4,201,664 A | 5/1980 | Hekal | |
| 2002/0164443 A1 | 11/2002 | Oles et al. | |
| 2008/0113188 A1* | 5/2008 | Shah | C08J 7/04 428/336 |
| 2008/0221262 A1* | 9/2008 | Mabry | B82Y 30/00 524/588 |
| 2010/0316842 A1 | 12/2010 | Tuteja et al. | |
| 2012/0000853 A1* | 1/2012 | Tuteja | B01D 69/02 210/650 |
| 2017/0204291 A1* | 7/2017 | Berry | C08G 77/045 |

OTHER PUBLICATIONS

United States Patent and Trademark Office, Non-Final Office Action in U.S. Appl. No. 12/599,465, dated Dec. 12, 2017, 12 pages total.
United States Patent and Trademark Office, Final Office Action in U.S. Appl. No. 14/939,953, dated Apr. 2, 2018, 16 pages total.
United States Patent and Trademark Office, Final Office Action in U.S. Appl. No. 14/939,953, dated Apr. 2, 2018.
European Patent Office, European Search Report in Application No. 14851492.0, dated May 2, 2017, 8 pages total.
A. K. Kota et al., "Hygro-responsive membranes for effective oil-water separation," Nature Comm., vol. 3 (2012) 1-8.
G. Kwon et al., "On-demand separation of oil-water mixtures," Adv. Mater., vol. 24 (2012) 3666-3671.
United States Patent and Trademark Office, Non-Final Office Action in U.S. Appl. No. 15/479,929, dated Dec. 31, 2018, 10 pages total.
A. J. Meuler et al., "Examination of wettability and surface energy in fluorodecyl POSS/polymer blends," Soft Matter, vol. 7 (2011) 10122-10134.

* cited by examiner

*Primary Examiner* — Margaret G Moore
(74) *Attorney, Agent, or Firm* — AFMCLC/JAZ; Chastity Whitaker

(57) ABSTRACT

In some aspects, the present invention relates generally to self-release compositions and methods useful for the removal or prevention of mineral scaling and, more particularly, to surface coatings and surface treatments that resist, prevent, or aid in removal of mineral scaling. In some aspects, the self-release coating includes a polyhedral oligomeric silsesquioxane and a thermoplastic or an additive.

20 Claims, 11 Drawing Sheets

SURFACE COATINGS, TREATMENTS, AND METHODS FOR REMOVAL OF MINERAL SCALE BY SELF-RELEASE

CROSS-REFERENCES TO RELATED APPLICATION

This application is a continuation of U.S. application Ser. No. 14/732,652 (filed Jun. 5, 2015), and now U.S. Pat. No. 9,765,255, which claims the priority and benefit of U.S. Provisional Application No. 62/008,828 (filed Jun. 6, 2014) and is related to International Application No. PCT/US15/34407 (filed Jun. 5, 2015). The entire contents of each of these applications are hereby incorporated by reference.

RIGHTS OF THE GOVERNMENT

The invention described herein may be manufactured and used by or for the Government of the United States for all governmental purposes without the payment of any royalty.

FIELD OF THE INVENTION

In some aspects, the present invention relates generally to the removal or prevention of mineral scaling and, more particularly, to surface coatings and surface treatments that resist, prevent, or aid in removal of mineral scaling.

BACKGROUND OF THE INVENTION

Mineral fouling is a common occurrence in a variety of residential, commercial, and industrial operations when substrates are exposed to naturally occurring or so-called "tap" water. Some of the more recognizable examples include residential water heaters, residential shower heads, commercial HVAC systems having cooling towers or heat exchangers, heat exchangers in the chemical process industry, and oil and gas extraction operations. Mineral fouling, or the formation of mineral scale, is a result of the precipitation of salts dissolved in the water onto the substrate. Mineral scale can take the form of an accumulation of relatively soft deposits, generally caused by the deposition of minerals that precipitate in the bulk fluid. Soft scale is typically easy to remove. However, the solubility of dissolved salts decreases with temperature. Therefore, when the surface of a heated substrate is exposed to water containing dissolved salts, salts can directly precipitate onto the surface. Such directly precipitated deposits, which often comprise a combination of many different minerals including calcium sulfate and calcium carbonate, are extremely durable and resist removal via mechanical abrasion and/or dissolution by acids. As deposits accumulate on equipment surfaces, such as heat exchangers, the resistance to heat transfer increases, which results in decreased energy efficiency. It has been estimated that up to 0.25% of gross domestic product value is lost because of the inefficiencies in process equipment introduced by mineral scaling.

Numerous technologies have been developed to resist mineral scaling. Most of these conventional technologies rely on additives, introduced into the processing of water, to inhibit precipitation. However, these additives must be constantly supplied and replenished and may constitute contaminants in wastewater streams requiring expensive post-treatment processes to mitigate environmental concerns. More sophisticated techniques to reduce scaling include electromagnetic devices that expose a portion of the process water to a large magnetic field. The magnetic field is designed to disturb the motion of ions in the process water and, thereby, promote precipitation. By precipitating salts away from critical process equipment, the amount of subsequent precipitation to form mineral scale on critical equipment surfaces can be reduced. Such electromagnetic devices require a continuous power supply, are expensive to fabricate and maintain, and require additional space for installation, operation, and maintenance.

Yet another conventional, more elegant solution to mineral scaling is development of surface treatments or coatings that discourage or eliminate the growth of scale. As used herein, a "treatment" means application of a chemical compound to the surface of a substrate so as to form a deposit thereon that is not a mechanically-distinct layer overlying the surface and cannot exhibit layer behavior, such as delamination or peeling. As used herein, a "coating" means deposition of a chemical compound to the surface of a substrate so as to form a mechanically discrete layer that exhibits layer behavior, such as, a capacity of being peeled off. In the absence of information about mechanical properties, a layer having a thickness of less than about 10 nm will be considered a "treatment" while a layer having a thickness greater than about 10 nm will be considered a "coating." Conventional treatments and/or coatings that inhibit the growth of mineral scale include hydrophobic coatings, such as DuPont's Teflon® coatings, or hydrophilic coatings. In systems using mixtures of oil and water as a process fluid, the coatings that wet oil and that do not absorb water are preferred for resisting the growth of mineral scale. One such conventional coating includes an oil that is immiscible with water and prevents contact with the aqueous phase comprising the dissolved minerals. Still other conventional solutions include manufacture of surfaces having an energy of formation per unit area of less than about 32 $mJ/m^2$ and/or a ratio of polar-to-total energy of formation of less than 0.2. Such surfaces resist the accumulation of mineral scale in static environments due to a presumed decrease in the nucleation of mineral salt crystals on the surface of a substrate (e.g., microscope slides).

These conventional treatments and/or coatings are limited to resisting an initiation of mineral scale growth. If a material scale deposit begins, such as at a defect in the coating or treatment, then resistance to further accumulation of material scale is lost. Therefore, these conventional treatments or coatings lack the continuous counteraction provided by chemical or electromagnetic water treatment methods, described previously. Because the coatings on materials used in residential, commercial, and industrial environments (as opposed to laboratory environments) are likely to include defects, the practical value of coatings and/or treatments may be limited.

Despite these various advancements in the field of mineral scaling, there remains a need for improved methods by which the accumulation of mineral scale can be resisted. It would be desirable for such improved methods to combine the elegance of a simple surface treatment or coating with the continuous counteraction provided by chemical or electromagnetic water treatments and that may be realized by application of a thin-layer treatment or coating without a substantial increase in thermal resistance (generally speaking, the thermal resistance is proportional to a layer thickness divided by a thermal conductivity).

Fundamental studies of the adhesion of solid objects to polymeric coatings, such as the ice adhesion study of Meuler et al., *ACS Appl. Mater. Interfaces*, Vol. 2, pp. 3100-3110 ("Meuler") have shown that, when very thin coatings on rigid substrates are used, the "practical work of adhesion"

decreases as the receding contact angle of the surface in contact with an appropriate probe liquid increases. The force needed to remove a solid object from such a surface is proportional to the practical work of adhesion. As a result, the receding contact angle measured using an appropriate probe liquid provides a reliable indication of the relative amount of force (per unit area) needed to remove a solid object from the surface. For the adhesion of ice, liquid water is clearly the most appropriate probe liquid. For other substances, however, such as adhered metal, the use of a molten form of the solid as a probe liquid is not practical, as it may require temperatures that would destroy the coating.

Moreover, it is well known to those skilled in the art of adhering surfaces that the roughness of a surface is a critical determinant of adhesion. Smooth surfaces are known to have significantly lower adhesion than rough surfaces. Generally speaking, a rougher surface provides a greater true surface area than a smooth surface, thus increasing the total force required to remove an object from said surface even when the "work of adhesion," which is the energy required per unit of true surface area, remains the same. Furthermore, roughening of surfaces provides locations where mechanical interlocking of the surface and an adhered object may occur. Removal of the solid object then requires overcoming the mechanical interlocking forces in addition to overcoming the work of adhesion. Conveniently, the receding contact angle of a fully wetted surface is known to decrease with increasing roughness. Thus, as an indicator of adhesion, the receding contact angle measurement accounts not only for chemical interactions between surfaces, but also for roughness.

In addition to roughness, the physical and chemical heterogeneity of a surface also contribute to the adhesion of solid objects. In particular, heterogeneous surfaces contain locations of increased affinity between the surface and an adhered solid object, due either to chemical species or to physical topography that "pins" an adhered object to the surface. These heterogeneities may be considered as "pinning defects." The greater the number and tenacity of these pinning defects, the greater the adhesion of a solid object to a surface will be. Again, conveniently, the presence of pinning defects tends to increase the difference between advancing and receding contact angles on a surface. Because the receding contact angle is, in all but exceptionally rare cases, smaller than the advancing contact angle, the presence of pinning defects will decrease the receding contact angle as it increases the difference between the advancing and receding angle. Therefore, the receding contact angle also captures effects due to pinning defects on surface adhesion.

Beyond the aforementioned effects, it is also possible for the molecular fragments present on many surfaces to reorganize into new physical arrangements upon contact with liquids and solids. Such rearrangements almost always draw molecular fragments with an affinity for the adhering substance closer to the surfaces, but push away fragments with a lower affinity. Such rearrangements therefore increase the adhesion of solid and liquid objects to surfaces. Again, conveniently, this phenomenon leads to a difference between advancing and receding contact angles as measured on a surface. As described before, the net result is that surfaces with a greater capacity to reorganize in contact with a particular liquid will demonstrate a lower receding contact angle. As an indicator of adhesion, therefore, receding contact angles also capture effects due to surface reorganization.

Surfaces having a terminal —$CF_3$ molecular fragment at the outermost molecular layer are known to have generally the highest contact angles with water, the lowest surface energies, and the lowest levels of adhesion and frictional interaction with solids and liquids. When these —$CF_3$ fragments are immediately adjacent to fragments other than —$CF_2$— linking fragments, dipolar forces result that increase adhesion. Moreover, surfaces with —$CF_3$ fragments connected to a small number of, or no, adjacent —$CF_2$— linking fragments are prone to reorganization. It is therefore known that, to produce a surface having minimal adhesion to solid or liquid objects, a well-ordered array of —$CF_3$ fragments adjacent to as many —$CF_2$-linking fragments as possible, having minimal roughness and minimal defects, is required. Although methods of chemical modification, for instance with silanes, are known to produce such surfaces, at present, general methods and compositions for producing such surfaces using discrete molecules, without chemical modification of an underlying substrate, are not known. Such methods and compositions must satisfy the following requirements: 1) allow for self-assembly of a well-ordered monolayer of —$CF_3$ fragments adjacent to numerous —$CF_2$-linking fragments within a practical time frame, 2) maintain this arrangement under conditions of operation for a long enough period to be of practical use, 3) prohibit naturally occurring surface rearrangements (such as the growth of large crystalline domains) that produce pinning defects, and 4) produce surfaces with the minimum possible roughness.

BRIEF SUMMARY OF THE INVENTION

The present invention overcomes the foregoing problems and other shortcomings, drawbacks, and challenges of resisting and/or removing accumulations of mineral scale. While the invention will be described in connection with certain embodiments, it will be understood that the invention is not limited to these embodiments. To the contrary, this invention includes all alternatives, modifications, and equivalents as may be included within the spirit and scope of the present invention.

In one aspect, the present invention sets forth a self-release composition that includes a polyhedral oligomeric silsesquioxane and a thermoplastic, wherein the polyhedral oligomeric silsesquioxane is a —$CF_3$ terminal fluorous compound.

In one aspect, the present invention sets forth a self-release composition including a polyhedral oligomeric silsesquioxane and an additive, wherein the additive imparts a surface energy of less than about 15 mJ/m$^2$; and wherein at least one member of the group consisting of the polyhedral oligomeric silsesquioxane and the additive is a —$CF_3$ terminal fluorous compound.

In one aspect, the present invention sets forth a method of removing a mineral scale from the substrate comprising a self-release composition coating as otherwise described herein, the method including directing a turbulent flow toward an interface between the mineral scale and the substrate surface.

In one aspect, the present invention sets forth a method of preparing a self-release substrate as otherwise described herein, the method including:

combining a —$CF_3$ terminal fluorous polyhedral oligomeric silsesquioxane with a thermoplastic to make a mixture;

applying the mixture to a substrate surface; and drying the applied mixture on the substrate surface.

In one aspect, the present invention sets forth a method of preparing a self-release substrate, the method including:

applying at least two layers that include a —CF$_3$ terminal fluorous polyhedral oligomeric silsesquioxane to a substrate surface to form a first plurality of —CF$_3$ terminal fluorous oligomeric silsesquioxane layers;

applying a layer comprising at least two layers that include a thermoplastic to the substrate surface to form a second plurality of thermoplastic layers; and drying the applied layers on the substrate surface.

In one aspect, the present invention sets forth a method of preparing a self-release substrate, the method including:

applying at least two layers that include an additive to a substrate surface to form a first plurality of additive layers, wherein the additive imparts a surface energy of less than about 15 mJ/m$^2$, and wherein the additive is a —CF$_3$ terminal fluorous compound;

applying at least two layers that include a thermoplastic to the substrate surface to form a second plurality of thermoplastic layers; and drying the applied layers on the substrate surface.

Additional objects, advantages, and novel features of the invention will be set forth in the description that follows and will also become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
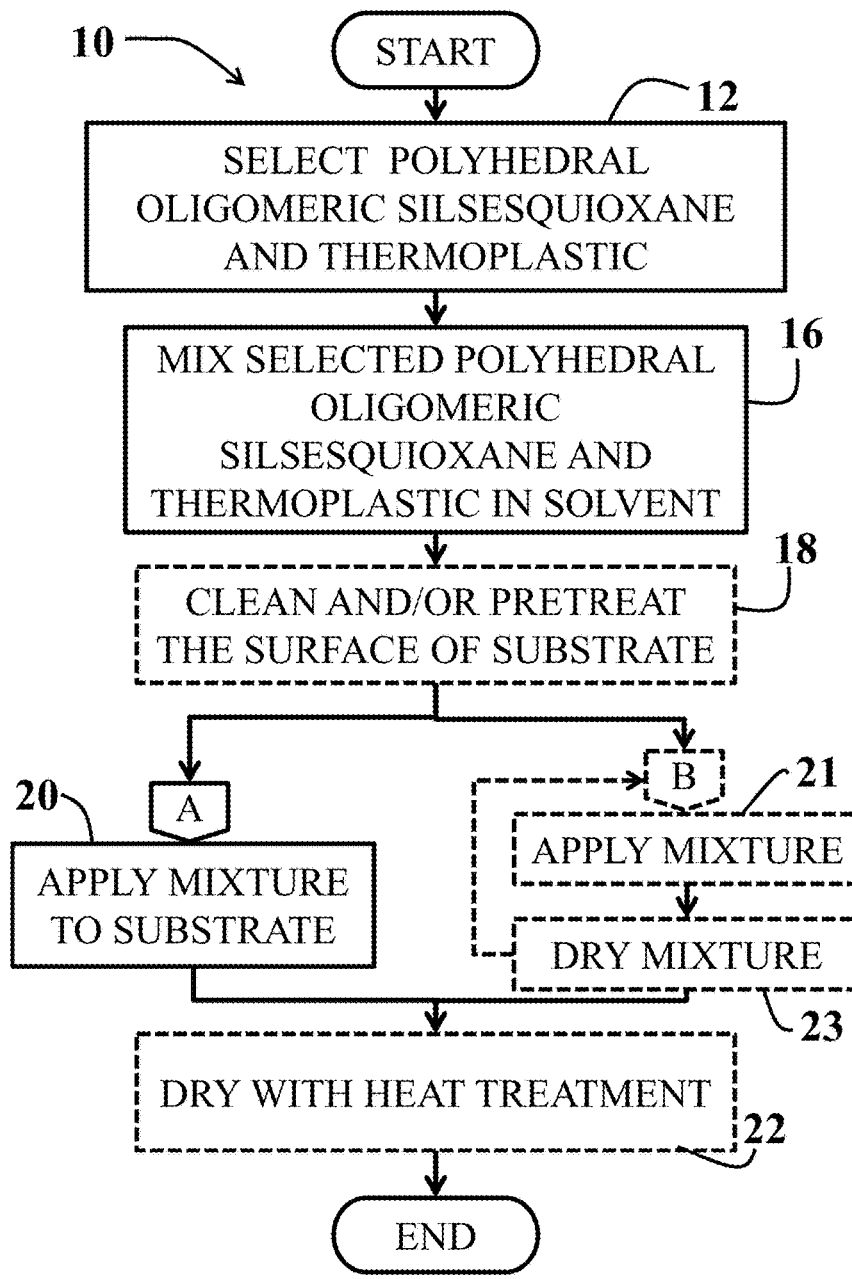
FIG. 1 is a flowchart illustrating a method of preparing and applying a surface coating to a substrate in accordance with an embodiment of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described herein. In addition, the materials, methods, and examples described are illustrative only and not intended to be limiting. All publications, patent applications, patents, and other references mentioned herein are incorporated by reference in their entirety. In case of conflict, the present specification, including these definitions, will control.

The terms "a," "an," or "the" as used herein not only include aspects with one member, but also include aspects with more than one member. For example, an aspect including "an additive and a thermoplastic" should be understood to present certain embodiments with at least a second additive, at least a second thermoplastic, or both.

The term "about" as used herein to modify a numerical value indicates a defined range around that value. If "X" were the value, "about X" would generally indicate a value from 0.95X to 1.05X. Any reference to "about X" specifically indicates at least the values X, 0.95X, 0.96X, 0.97X, 0.98X, 0.99X, 1.01X, 1.02X, 1.03X, 1.04X, and 1.05X. Thus, "about X" is intended to teach and provide written description support for a claim limitation of, e.g., "0.98X." When the quantity "X" only includes whole-integer values (e.g., "X carbons"), "about X" indicates from (X−1) to (X+1). In this case, "about X" as used herein specifically indicates at least the values X, X−1, and X+1.

When the term "about" is applied to the beginning of a numerical range, it applies to both ends of the range. Thus, "from about 5 to 20%" is equivalent to "from about 5% to about 20%." When "about" is applied to the first value of a set of values, it applies to all values in that set. Thus, "about 7, 9, or 11%" is equivalent to "about 7%, about 9%, or about 11%." However, when the modifier "about" is applied to describe only the end of a range or only a later value in a set of values, it applies only to that value or that end of the range. Thus, the range "about 2 to 10" is the same as "about 2 to about 10," but the range "2 to about 10" is not.

In compositions comprising an "additional," "further," or "second" component or step, the "second" component or step is chemically different from the first component. A "third" component is different from the other, first, and second components, and additional enumerated or "further" components or steps are similarly different.

The terms "adhesion" and "adhesive strength" as used herein refers to an intrinsic property of an arrangement of molecules at a surface and the force required to detach them from the surface. The adhesion and adhesive strength may be defined for a region of any size down to the scale of individual molecules, and may vary from location to location at the surface, whereas the self-release characteristic is a binary (present or not present) feature of the surface.

The term "alkyl" as used herein includes an aliphatic hydrocarbon chain that may be straight chain or branched. The aliphatic hydrocarbon chain may contain an indicated number of carbon atoms: For example, $C_1$-$C_{12}$ indicates that the group may have from 1 to 12 (inclusive) carbon atoms in it. If not otherwise indicated, an alkyl group may include about 1 to about 20 carbon atoms. In one aspect, alkyl groups have 1 to about 12 carbon atoms in the chain. In another aspect, alkyl groups ("lower alkyl") have 1 to about 6 carbon atoms in the chain. Examples may include, but are not limited to, methyl; ethyl; propyl; isopropyl (iPr); 1-butyl; 2-butyl; isobutyl (iBu); tert-butyl; pentyl; 2-methylbutyl; 1,1-dimethylpropyl; hexyl; heptyl; octyl; nonyl; decyl; docecyl; cyclopentyl; or cyclohexyl.

The linking term "comprising" or "comprise" as used herein is not closed. For example, "a composition comprising A" must include at least the component A, but it may also include one or more other components (e.g., B; B and C; B, C, and D; and the like).

As used herein, a "fluorous" or "fluorinated" group is a group that includes one or more fluoro-substituents. Examples include, but are not limited to, trifluoromethyl and perfluorobutyl. In one aspect (i.e., a "—$CF_3$ terminal fluorous" group), the fluorous group comprises at least one terminal trifluoromethyl group (i.e., a "—$CF_3$ terminal fluorous" group as otherwise set forth herein). In one aspect, a fluorous group includes a polyfluorinated subgroup, which may be adjacent to the —$CF_3$ groups to create a polyfluorinated subdomain. For example, the group —$(CH_2)_n(CF_2)_m CF_3$, in which n is an integer from 1 to 10 and m is an integer from 4 to 9, is one embodiment of a —$CF_3$ terminal fluorous group.

As used herein, the term "or" should in general be construed non-exclusionarily. For example, "a composition comprising A or B" would also apply to an embodiment comprising both A and B. "Or" should, however, be construed to exclude those aspects presented that cannot be combined without contradiction (e.g., a thickness of 10 to 40 nm and a thickness of 100 to 200 nm).

The terms "self-release" or "self-release" as used herein are directed to an aspect of a surface immersed (at least partially) in a fluid medium. The term "self-release" indicates that an adhered material (e.g., a solid, such as a mineral scale) will detach from one or more locations on the surface due only to mechanical forces generated by the immersing fluid, such as the force from fluid flow along the self-release surface. In particular, the term "self-release" indicates that no external mechanical action by other solid objects, such as scrubbing, scraping, rubbing, abrading, or grinding, is required to detach an adhered material from the self-release surface. In one embodiment of the present invention, the adhered material is an area of mineral scale produced by exposure to hard water.

In the present invention, the flow characteristics of the fluid are not arbitrary, but are limited to those encountered in common industrial processes, such as heat exchange and interior flow within a pipeline. Supersonic fluid flows or flows of plasma jets are excluded. Flowing fluid that exclusively takes the form of sprayed jets or another form in which sprayed droplets of the fluid impart forces primarily through elastic collisions with the surface is also excluded.

The term "self-release" is distinct from terms such as "low adhesion" in that "self-release" is a performance characteristic of an extended solid object that depends on the surface topography, adhesive characteristics, and the uniformity of those characteristics across an extended area. A coating is described as a self-release coating if the surface formed by applying the coating to an object exhibits the characteristic of self release.

The terms "weight percent," "w/w," and "wt/wt" as used herein refer to a percentage expressed in terms of the weight of the ingredient or agent over the total weight of the composition multiplied by 100.

In one aspect, the present invention sets forth a self-release composition that includes a polyhedral oligomeric silsesquioxane and a thermoplastic. In a more specific aspect, the polyhedral oligomeric silsesquioxane is a —$CF_3$ terminal fluorous compound.

In one aspect, the present invention sets forth a self-release composition including a polyhedral oligomeric silsesquioxane and an additive, wherein the additive imparts a surface energy of less than about 15 mJ/m$^2$. In a more specific aspect, at least one member of the group consisting of the polyhedral oligomeric silsesquioxane and the additive is a —$CF_3$ terminal fluorous compound.

In one aspect, the present invention sets forth a self-release composition as set forth elsewhere herein, further including a solvent. In a more specific aspect, the solvent is a semi-fluorinated hydrocarbon. In a still more specific aspect, the solvent includes 3,3-dichloro-1,1,1,2,2-pentafluoropropane and 1,3-dichloro-1,1,2,2,3-pentafluoropropane (e.g., Asahiklin AK225G or other commercially available semi-fluorinated hydrocarbons). Examples of other commercially available semi-fluorinated hydrocarbons usable in this aspect include 1,1,1,2,2,3,4,5,5,5-decafluoropentane; 1,1,2,2-tetrafluoroethyl-2,2,2-trifluoroethyl ether; and 1,1,2,2,3,3,4-heptafluorocyclopentane.

In one aspect, the present invention sets forth a self-release composition as set forth elsewhere herein, wherein the composition includes from about 0.1% to about 70% (w/w) of the polyhedral oligomeric silsesquioxane. In a more specific aspect, the composition includes from about 0.25, 0.5, 0.75, 1, 2, 3, 4, 5, 6, 7, 8, or 9% (w/w) to about 31, 32, 33, 34, 35, 36, 37, 38, 39, 40, 45, 50, 65, or 70% (w/w).

In a more specific aspect, the composition includes from about 10% to about 30% (w/w) of the polyhedral oligomeric silsesquioxane. In a still more specific aspect, the composition includes about 10, 11, 12, 13, 14, 15, 16, 17, 18, 19, 20, 21, 22, 23, 24, 25, 26, 27, 28, 29, or 30% (w/w) of the polyhedral oligomeric silsesquioxane.

In one aspect, the present invention sets forth a self-release composition as set forth elsewhere herein, wherein the composition includes from about 30% to about 99.99% (w/w) of the thermoplastic. In a more specific aspect, the composition includes from about 35, 40, 45, 50, 55, 60, 61, 62, 63, 64, 65, 66, 67, 68, or 69% (w/w) to about 90, 91, 92, 93, 94, 95, 96, 97, 98, 99, or 99.9% (w/w).

In a more specific aspect, the composition includes from about 70% to about 90% (w/w) of the thermoplastic. In a still more specific aspect, the present invention sets forth a self-release composition as set forth elsewhere herein, wherein the composition includes about 70, 71, 72, 73, 74, 75, 76, 77, 78, 79, 80, 81, 82, 83, 84, 85, 86, 87, 88, 89, or 90% (w/w) of the thermoplastic.

In one aspect, the present invention sets forth a self-release composition as set forth elsewhere herein, wherein the polyhedral oligomeric silsesquioxane is a fluorous polyhedral oligomeric silsesquioxane. In a more specific aspect, the fluorous polyhedral oligomeric silsesquioxane is a —$CF_3$ terminal fluorous polyhedral oligomeric silsesquioxane. In one embodiment, the polyhedral oligomeric silsesquioxane is octakis(1H,1H,2H,2H-heptadecafluorodecyl) polyhedral oligomeric silsesquioxane.

In one aspect, the present invention sets forth a self-release composition as set forth elsewhere herein, wherein the thermoplastic is a member selected from the group of poly(methyl methacrylate), amorphous polyacrylate, poly(alkyl)acrylate, polystyrene, polyacrylonitrile, polysulfone, polyethersulfone, and poly-D-lactic acid. In one embodiment, the thermoplastic is poly(methyl methacrylate).

In one aspect, the present invention sets forth a self-release composition as set forth elsewhere herein, wherein the thermoplastic is an amorphous thermoplastic that is not swelled more than about 10% by water, wherein the amorphous thermoplastic includes at most about 20% (w/w) fluorine, and wherein the amorphous thermoplastic includes about 5% (w/w) of hydrophilic groups.

In one aspect, the present invention sets forth a self-release composition as set forth elsewhere herein, further including an additive, wherein the additive imparts a surface energy of less than about 15 mJ/m$^2$. In a more specific aspect, the additive is a —$CF_3$ terminal fluorous compound. In one embodiment, the additive is perfluorooctanoic acid. In one embodiment, the additive is selected from the group consisting of perfluorooctanoic acid, perfluorohexanoic acid, perfluorooctane, and 1H,1H,1H,2H,2H-heptadecafluorodecane.

In one aspect, the present invention sets forth a substrate, wherein the substrate has a substrate surface, and wherein a self-release composition as otherwise described herein is applied to the substrate surface. In a more specific aspect, the self-release composition adheres to the substrate surface as a self-release coating.

In one aspect, the present invention sets forth a self-release coating as otherwise described herein, wherein the self-release coating has a thickness ranging from about 100 to 350 nm. In one aspect, the self-release coating has a thickness ranging from about 100 to 200 nm. In one aspect, the self-release coating has a thickness ranging from about 50 to 200 nm. In one aspect, the self-release coating has a thickness ranging from about 25 to 150 nm. In one aspect, the self-release coating has a thickness ranging from about 10 to 100 nm. In one aspect, the self-release coating has a thickness ranging from about 10 to 50 nm.

In one aspect, the self-release coating has a thickness of about 500, 450, 400, 350, 300, 275, 250, 225, or 200 nm. In one aspect, the self-release coating has a thickness of about 200, 175, 150, 125, 100, 90, 80, 75, 70, 65, 60, 55, or 50 nm. In one aspect, the self-release coating has a thickness of about 50, 45, 40, 35, 30, 25, or 20 nm. In one aspect, the self-release coating has a thickness of about 19, 18, 17, 16, 15, 14, 13, 12, 11, or 10 nm.

In one aspect, the self-release surface is a self-release treatment with a thickness of about 10, 9, 8, 7, 6, 5, 4, 3, 2, or 1 nm.

In one aspect, the present invention sets forth a self-release coating as otherwise described herein, wherein the self-release coating has a roughness of less than about 1000, 900, 800, 750, 700, 600, 500, 450, 400, 350, 300, or 250 nm (e.g., from <1 to 250 nm). In one aspect, the self-release coating has a roughness of less than about 250, 225, 200, 175, 150, 125, or 100 nm. In one aspect, the self-release coating has a roughness of less than about 100, 90, 80, 70, 60, 50, 45, 40, 35, 30, 25, 20, 15, or 10 nm. In one aspect, the self-release coating has a roughness of less than about 10, 9, 8, 7, 6, 5, 4, 3, 2, or 1 nm.

In one aspect, the present invention sets forth a method of removing a mineral scale from the substrate as otherwise described herein, the method including: directing a turbulent flow toward an interface between the mineral scale and the substrate surface.

In one aspect, the present invention sets forth a method of preparing a self-release substrate as otherwise described herein, the method including: combining a polyhedral oligomeric silsesquioxane with a thermoplastic to make a mixture; applying the mixture to a substrate surface; and drying the applied mixture on the substrate surface.

In a more specific aspect, the polyhedral oligomeric silsesquioxane is a fluorous polyhedral oligomeric silsesquioxane. In a more specific aspect, the fluorous polyhedral oligomeric silsesquioxane is a —$CF_3$ terminal fluorous polyhedral oligomeric silsesquioxane.

In one aspect, the present invention sets forth a method as otherwise described herein, the method further including: cleaning the substrate surface before applying the mixture thereto. In a more specific example, cleaning the substrate surface includes applying a surfactant, applying an alcohol, applying an aromatic solvent, applying a functional organic solvent, plasma etching, flame exposure, acid etching, or electrical arc exposure.

In one aspect, the present invention sets forth a method as otherwise described herein, wherein applying the mixture includes spraying, dip coating, web coating, roll coating, electrodeposition, vapor deposition, or implantation.

In one aspect, the present invention sets forth a method of preparing a self-release substrate, the method including: applying at least two layers that include a polyhedral oligomeric silsesquioxane to a substrate surface to form a first plurality of oligomeric silsesquioxane layers; applying a layer comprising at least two layers that include a thermoplastic to the substrate surface to form a second plurality of thermoplastic layers; and drying the applied layers on the substrate surface.

In a more specific aspect, the polyhedral oligomeric silsesquioxane is a fluorous polyhedral oligomeric silsesquioxane. In a more specific aspect, the fluorous polyhedral oligomeric silsesquioxane is a —$CF_3$ terminal fluorous polyhedral oligomeric silsesquioxane.

In a more specific aspect, the first plurality of polyhedral oligomeric silsesquioxane layers is applied before applying the second plurality of thermoplastic layers. In another more specific aspect, one layer of the second plurality is applied after applying each layer of the first plurality.

In a more specific aspect, the present invention sets forth a method as otherwise described herein, the method further including: drying the applied layer of the first or second plurality before applying the next layer of the second or first plurality.

In a more specific aspect, the present invention sets forth a method as otherwise described herein, the method further including: applying at least two layer that include an additive to the substrate surface to form a third plurality of additive layers, wherein the additive imparts a surface energy of less than about 15 mJ/m$^2$. In a more specific aspect, the additive is a —CF$_3$ terminal fluorous compound.

In a more specific aspect, the present invention sets forth a method as otherwise described herein, the method further including: cleaning the substrate surface before applying any layer of the first, second, or third plurality thereto.

In a more specific aspect, the present invention sets forth a method as otherwise described herein, wherein cleaning the substrate surface includes applying a surfactant, applying an alcohol, applying an aromatic solvent, applying a functional organic solvent, plasma etching, flame exposure, acid etching, or electrical arc exposure.

In a more specific aspect, the present invention sets forth a method as otherwise described herein, wherein applying the mixture includes spraying, dip coating, web coating, roll coating, electrodeposition, vapor deposition, or implantation.

In one aspect, the present invention sets forth a method of preparing a self-release substrate, the method including: applying at least two layers that include an additive to a substrate surface to form a first plurality of additive layers, wherein the additive imparts a surface energy of less than about 15 mJ/m$^2$; applying at least two layers that include a thermoplastic to the substrate surface to form a second plurality of thermoplastic layers; and drying the applied layers on the substrate surface. In a more specific aspect, the additive is a —CF$_3$ terminal fluorous compound.

In one aspect, the present invention sets forth a composition configured to be applied to a surface of a substrate and to render the surface self-release as substantially described herein.

Figure 2:
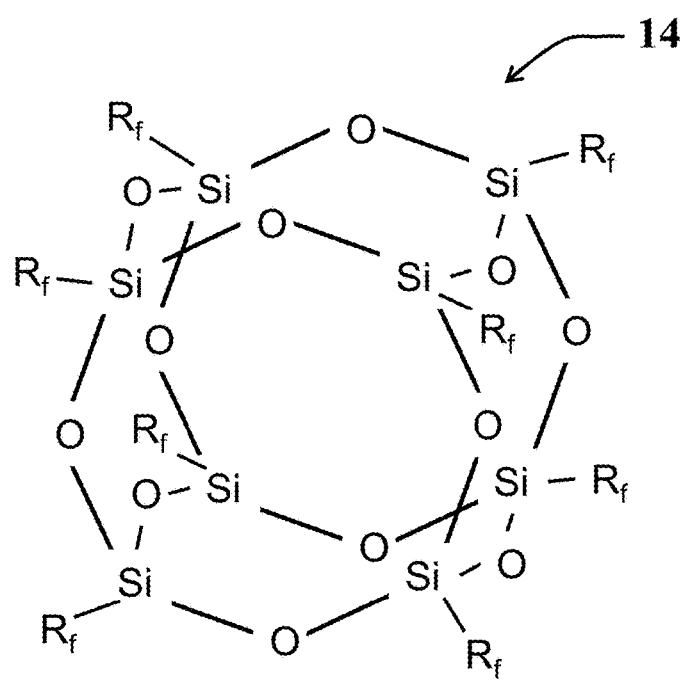
FIG. 2 is a schematic, line-drawing representation of a chemical structure of a fluorinated polyhedral oligomeric silsesquioxane according to an embodiment of the present invention.

Turning now to the figures, and in particularly, FIG. 1, a flowchart 10 illustrating a method of preparing and applying a surface coating is shown and described below in detail. At start, a polyhedral oligomeric silsesquioxane ("POSS") is selected (Block 12). The POSS may be fluorinated (i.e., "F-POSS") and having a chemical structure 14 as shown in FIG. 2. More particularly, the F-POSS 14 may be octakis (1H,1H,2H,2H-heptadecafluorodecyl) polyhedral oligomeric silsesquioxane ("F-decyl POSS"), wherein each R$_f$ group of FIG. 2 represents a heptadecafluorodecyl; however, any fluorinated alkyl group including at least four perfluorinated aliphatic carbons in a linear sequence and terminating in a trifluoromethyl (—CF$_3$) group, wherein the terminal trifluoromethyl group forms a part of the aforementioned linear sequence, may be used. For simplicity, any molecular fragment that meets the aforementioned sequential chemical structure requirements will be described herein as a "—CF$_3$ terminal fluorous" sequence. Furthermore, the R$_f$ groups need not all be identical, as long as each and every group contains at least one —CF$_3$ terminal fluorous sequence. To function properly in the invention, the F-POSS molecules must be capable of self-assembly such that a well-ordered array of fluorinated chains forms on a surface to which the F-POSS molecules are applied so that a majority of the outermost molecular layer at the surface is formed by the terminus of a —CF$_3$ terminal fluorous group.

POSS nanostructures may be synthesized in accordance with U.S. Pat. No. 6,716,919, entitled NANOSTRUCTURED CHEMICALS AS ALLOYING AGENTS IN POLYMERS; U.S. Pat. No. 7,897,667, entitled FLUORINATED POSS AS ALLOYING AGENTS IN NON-FLUORINATED POLYMERS; and U.S. Pat. No. 7,193,015, entitled NANOSTRUCTURED CHEMICALS AS ALLOYING AGENTS IN FLUORINATED POLYMERS. The disclosures of these references are incorporated herein by reference, each in its entirety.

In addition to POSS compounds, one or more additives—in one aspect, discrete compounds containing one or more —CF$_3$ terminal fluorous groups that self-assemble to form stable —CF$_3$ terminal fluorous surfaces—may be substituted in part or in whole for the POSS compound. Examples of such a compound include perfluorooctanoic acid, perfluorohexanoic acid, perfluorooctane, and 1H,1H,1H,2H,2H-heptadecafluorodecane. In some embodiments, the molecular weight of the additive will exceed 1000 g/mol, to limit the fugacity of the compound and thereby increase the durability of the surface chemical structure. In some other embodiments, the —CF$_3$ terminal fluorous surface will be thermodynamically stable at temperatures exceeding 85° C.

Likewise, a thermoplastic is selected (Block 12), which may be, for example, poly(methyl methacrylate) ("PMMA"). Any other amorphous polyacrylate, poly(alkyl) acrylate, polystyrene, polyolefin, polyacrylonitrile, polysulfone, polybutadiene, polyethersulfone, poly-D-lactic acid, or any other amorphous thermoplastic not swelled more than about 10% by water, comprising less than about 20 wt % fluorine, and comprising less than about 5 wt % of groups imparting water solubility (such as alcohol, carboxylic acid, or ionomeric groups) may be used. An important limitation is that the thermoplastic's glass transition temperature must be at least 20° C. higher than the intended use temperature, e.g., at least 30° C. higher than the intended use temperature. If the glass transition temperature does not meet these requirements, then large crystals of an F-POSS, a fluorinated anti-adhesion agent, or both will grow on the surface, leading to pinning defects and increased surface roughness. The selection of the thermoplastic is motivated by the need for the —CF$_3$ terminal fluorous surface to self-assemble. Too much fluorine in the thermoplastic will lead to an insufficient thermodynamic driving force to segregate the fluorous groups at the surface. Crystallinity or cross-linking will inhibit the segregation process. Too much ingress of water will result in thermodynamic driving forces that push the fluorous groups away from the surface rather than toward it.

In Block 16, the selected POSS (weight percent ranging from 0.1% to 70% by weight, e.g., 10% to 30% by weight) is mixed with the selected thermoplastic (weight percent ranging from 30% to 99.9%, e.g., 70% to 90%) and dissolved in a suitable solvent at concentrations ranging from 0.01 mg/L to 200 mg/L, e.g., 1 mg/L to 50 mg/L; 10 mg/L to 30 mg/L. The suitable solvent is selected, at least in part, to be compatible with a selected method of treating a substrate with the mixture, which is described in great detail below. Generally speaking, the suitable solvent is a semi-fluorinated hydrocarbon, semi-fluorinated hydrocarbon ether, perfluorinated hydrocarbon, or perfluorinated hydrocarbon ether. Asahiklin AK225G is an example of a suitable solvent.

The range of useful weight percent for the selected F-POSS is determined mainly by two factors: (i) the possible concentration of fluorinated groups at the outermost layer of the surface, and (ii) their rate of migration to the outer layer (rather than crystallization). At very low weight percentages, from 0.1% to as much as 10%, there may be an insufficient quantity of silsesquioxane present to permit accumulation of a complete and continuous coverage of fluorinated groups at the outermost molecular layer of the surface. At very high percentages, from as little as 30 wt %, the silsesquioxane may crystallize rapidly within the mixture of silsesquioxane, thermoplastic, and solvent during the process of forming the dried coating. Rapid crystallization will immobilize the silsesquioxane, thereby preventing migration to the outermost molecular layer at the surface.

The range of useful weight percent for F-POSS may also be influenced by the amount of other fluorous compounds present (e.g., other F-POSS or additives). In some embodiments, the F-POSS concentration may apply to the total concentration of all F-POSS components of a mixture; all F-POSS and fluorous additives as set forth herein; or all —$CF_3$ terminal fluorous species.

Any given substrate may be treated or coated with the mixture of Block 16, and may include, for example, substrates comprising a metal, a plastic, a ceramic, and composites thereof. Substrates may alternatively include nonvolatile liquid substrates, such as heavy oils or ionic liquids.

Before the mixture is applied to a given substrate, a surface of the substrate that will receive the mixture application may optionally be cleaned, pretreated, or both, so as to remove surface contaminants, control the surface topography, control the chemical composition of the surface, to facilitate the treatment or coating process, or a combination thereof (Optional Block 18). Cleaning may include treatment with surfactants, alcohols, aromatic solvents (e.g., toluene or xylenes), functional organic solvents (e.g., acetone or ethyl acetate), plasma etching, flame exposure, acid etching, or exposure to electrical arcs. The optional pretreatments, according to some embodiments of the present invention, may include applying a primer layer configured to promote adhesion of the mixture to the substrate. Other pre-treatments may also be applied to prevent corrosion, remove contaminants, alter surface texture, impart color or other tracing and tracking capabilities, or otherwise improve overall performance of the system.

With the mixture prepared (Block 16) and the optional cleaning and/or pretreatment (Block 18) complete, the mixture may be applied to the surface of the substrate using one of a plurality of coating or treatment processes (Block 20). Exemplary coating or treatment processes include, but are not limited to, spraying, dip coating, web coating, roll coating, electrodeposition, vapor deposition, implantation, or combinations of one or more thereof. As alluded to previously, the coating or treatment process will at least partially dictate characteristics of the solvent used in preparing the mixture. For instance, the solvent(s) may be selected so as to achieve more than 99.9% evaporation within the drying period (e.g., a span of a few seconds to a few hours) upon exposing the coated substrate to process temperatures that are compatible with maintaining the integrity of the substrate or the processing environment. Also, for instance, the concentration of solid ingredients in the coating process may be tuned to provide desired rheological characteristics, such as a viscosity low enough to allow for uniform distribution of the treatment or coating but high enough to prevent excess dripping on standing. These considerations are widely known to those skilled in the art of formulating and applying surface treatments and coatings.

The treatment or coating ingredients may be applied in a single step (e.g., a simple embodiment of FIG. 1 Path A's Block 20), or they may be applied in a sequence of application and drying steps (e.g., an embodiment of FIG. 1 Path B's Blocks 20 and 22) that is optionally repeated. The compositions of the treatments or coatings applied in these repeated steps may remain the same, or they may vary from cycle to cycle. The treatment or coating ingredients may also be applied in ratios that vary over time within a single cycle so as to produce spatial gradients in the applied coating. The treatment or coating ingredients may also include reinforcing particles, toughness enhancing particles, additives to control rheology, pigments and dyes, tracing and tracking indicators, indicators for aiding in measurement of coating properties, additives to improve abrasion and wear characteristics, or other additives and modifiers needed to improve one or more aspects of treatment or coating performance unrelated to fouling release, but commonly required in treatment or coating products, as readily understood by skilled practitioners of the art of treatment or coating formulation.

In any event, and with the coating or treatment complete, the substrate with the coating or treatment thereon may be dried. Optionally, and as provided in Block 22, the coating or treatment on the surface of the substrate may be dried via a heat treatment, in vacuum, by application of forced convection, by desiccation, or any other method suitable for removing solvents in times ranging from a few seconds to a few hours. The drying process may consist of a single step, or of multiple steps in sequence, possibly nested within repeating cycles of application and drying, as previously disclosed.

If no drying step is used, the coating must remain quiescent for a curing period ranging from at least 10 milliseconds to as long as 400 hours, which depends on variables (e.g., coating thickness and ambient temperature) that are understood by those skilled in the art. The quiescent period may also be accomplished during one or more drying steps. The quiescent period is required in order to allow for the physical rearrangement of molecules within the coating, as well as formation of the proper homogeneity and topography of the surface. As previously noted, the physical rearrangement of the molecules into the proper form is critical to the function of the invention, as is the formation of the correct topology and the homogeneity of the surface.

After drying, the topography of the dried surface may be further modified by methods such as abrasion, re-exposure to solvent followed by re-drying, or rubbing. These methods for topographical surface modification are well-known to those skilled in the art. To minimize the adhesion of fouling, the topographical roughness features of the surface are kept to a minimum. In embodiments, the average roughness ($R_a$) of the surface over an area of 0.1 mm×0.1 mm does not exceed 1 µm. In some embodiments, $R_a$ over an area of 0.1 mm×0.1 mm does not exceed 200 nm (e.g., about 200, 175, 150, 125, 100, 80, 60, 50, 40, 30, or 20 nm). In some embodiments, $R_a$ over an area of 0.1 mm×0.1 mm does not exceed 20 nm (e.g., about 20, 19, 18, 17, 16, 15, 14, 13, 12, 11, 10, 9, 8, 7, 6, 5, 4, 3, 2, or 1 nm). To minimize the interference with heat transfer, the average thickness of the deposited, dried, and modified treatment or coating does not exceed 1 µm (e.g., about 1000, 950, 900, 850, 800, 750, 700, 650, 600, 550, 500, 450, 400, 350, 300, 250, or 200 nm). In some embodiments, the average thickness does not exceed 100 nm (e.g., about 100, 90, 80, 70, 60, 50, 40, 30, or 20 nm).

Figure 3A:
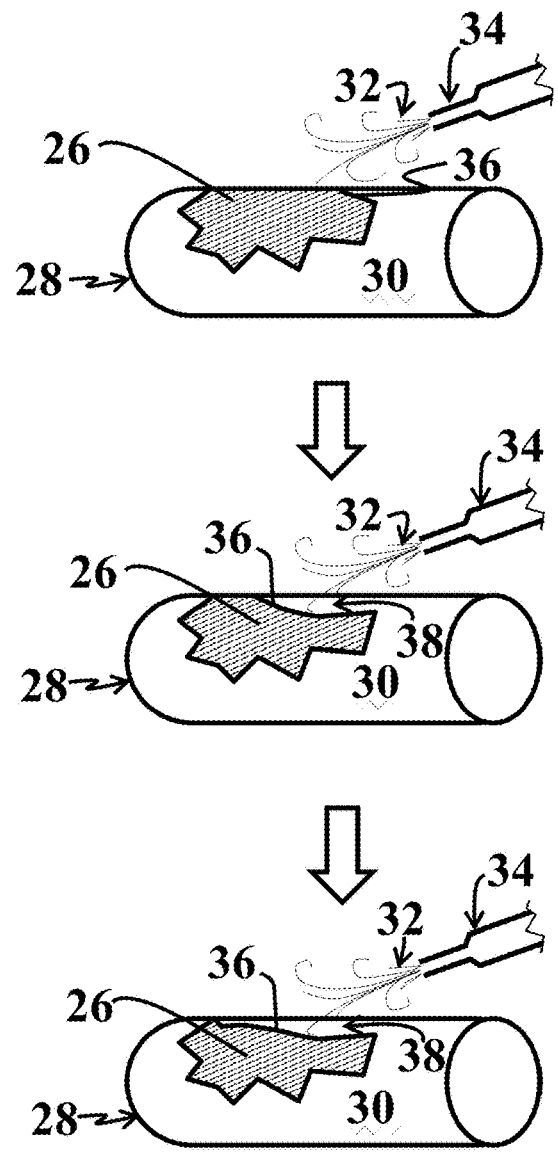
FIGS. 3A to 3C are a sequential, schematic representation of a method of removing mineral scale from a substrate having the surface coating of FIG. 1 and in accordance with an embodiment of the present invention.

With reference now to FIG. 3A, removal of a mineral scale 26 from a substrate 28 treated or coated in accordance with an embodiment herein is shown. Substrate 28 is illustrated here as an outer surface (e.g., of a section of tubing) 30 in contact with a fluid (not shown). At start, a turbulent fluid flow 32 is generated (for example, from a water nozzle 34) and is directed toward an interface 36 between the mineral scale 26 and the coated or treated surface of the substrate 28. The fluid supplying the turbulent fluid flow 32 may include, but is not limited to, water, another solvent (e.g., methanol or acetone), a detergent (e.g., sodium dodecyl sulfate), a petroleum fraction (e.g., kerosene), or combinations thereof, wherein each fluid may be a liquid or a gas. The fluid may consist of multiple phases in contact, such as a petroleum phase (e.g., kerosene) mixed with an aqueous phase (e.g., salt water, sea water, or an aqueous solution of a salt). According to still another embodiment of the present invention, particulates (not shown) may be suspended within the fluid, such particulates comprising, for example, sand grains. If desired, the fluid may also be heated, such as by heat transfer from the interior of the substrate 28. The treated or coated substrate 28 may be wholly immersed in one or more fluid phases, with treatment or coating present on the outer surface only, or the treated or coated substrate may partially or wholly enclose one or more fluid phases, with the inner surface treated or coated, or both inner and outer surfaces may be exposed to one or more separate or continuous fluid phases, with either or both of the inner and outer surfaces treated or coated (with the same or different treatments or coatings).

When the laminar or turbulent fluid flow 32 reaches or exceeds a critical threshold, as determined by the particular geometric configuration of the coated or treated surface 30 and surrounding flow, if any, the fluid velocity provides a lifting force over the surface 30, which is created by a Venturi effect. The result is a shear force on an outermost solid layer of substrate 28. In some embodiments of the present invention, transient radial and tangential forces may be associated with fluctuations in the fluid velocity field. If present, particulates suspended within the turbulent fluid flow 32 may further provide an impact force. In toto, the forces are transmitted to the coated or treated substrate 28, thereby creating stresses at the interface 36. Such stresses, particularly at interfacial flaws at the interface 36 between the coated or treated surface 30 and the mineral scale 26 are intensified, which causes local delamination of the mineral scale 26 to yield a delaminated portion 38 of the surface 30 of the substrate 28. With further exposure to the turbulent fluid flow, the size of the interfacial flaws, and thereby the delaminated portion 38, propagate across the interface 36.

Moreover, according to some embodiments of the present invention, exposure to the turbulent fluid flow 32 may generate vibrations or pressure fluctuations, which further facilitate delamination by a self-release process.

Coating or treatment of the surface of a substrate, as taught in the various embodiments herein, should not be limited to outer substrate surfaces as exemplified in FIG. 3A. According to another exemplary embodiment of the present invention illustrated in FIG. 3B, a lumen 40 extending the longitudinal axis 42 of a tube 44 is coated or treated according to an embodiment of the present invention. An outer surface 46 of the tube 44 remains untreated.

Figure 3B:
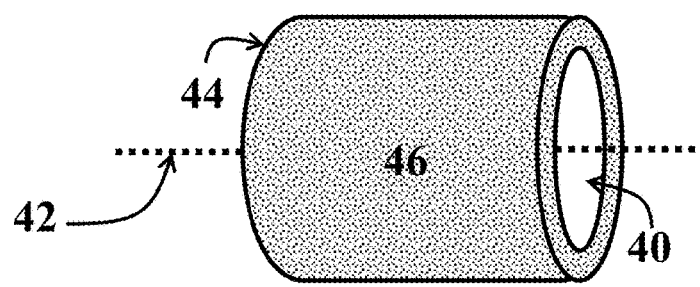
Figure 3C:
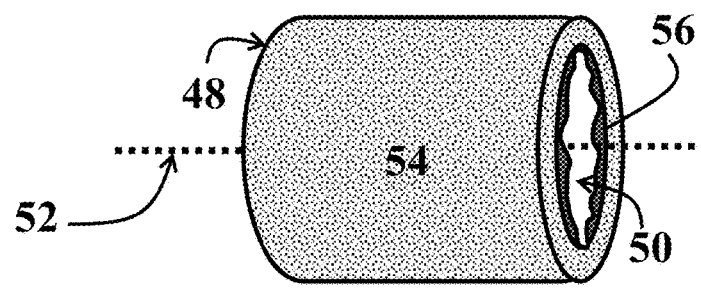

In contrast, FIG. 3C illustrates a similar tube 48 with a lumen 50 along its longitudinal axis 52 and an untreated outer surface 54, but without coating or treatment. FIG. 3C also shows the long-term effects of exposing the lumen 50 to so-called "tap" water. Over time, as suggested above in the Background of the Invention, mineral scaling 56 may deposit onto at least a portion of the untreated lumen 50 of the tube 54 of FIG. 3C.

The treated lumen 40 of the tube 44 of FIG. 3B would resist such mineral scale deposition. Assuming, arguendo, mineral scale were to deposit on the lumen 40 of the tube 44 of FIG. 3B, turbulent fluid flow, generally along the longitudinal axis 42 and in the manner described above for FIG. 3A, would promote delamination. In some embodiments where tap water continuously and turbulently flows through the tubing 44 of FIG. 3B, a steady state condition may be achieved whereby mineral scale depositions like 56 (FIG. 3C) are delaminated within a short period of time, if not nearly instantaneously, after formation or deposition.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

Outer surfaces of welded and annealed type 316/316L stainless steel tubes, each measuring 560 mm in length (22 inches), 6.35 mm outer diameter (0.250 inches), and 4.57 mm inner diameter (0.180 inches), purchased from Associated Tube Canada (Markham, Ontario, Canada) via Pac Stainless Ltd. (Seattle, Wash.) and were in accordance with ASTM A-249/10, ASTM A-269/10, AMSE SA 249 2007, and BRS 7, were processed as follows:

The outer surface of each tube was prepared by washing with liberal amounts of acetone and rinsed with isopropanol. Each tube was then passed slowly through a propane flame, which removed any residual organic compounds. Each tube was then left to cool to room temperature.

Solid ingredients (described below) for coating or treatment were dissolved in Asahiklin AK225G. The ingredients were weighed, individually, mixed together in a container to which the Asahilkin AK225G was added. Ingredients were allowed to dissolve while stirring using a magnetic stir bar. A 20-mL aliquot of the solution (having a final solid content of 30 mg/mL) was transferred into a Polytetrafluoroethylene ("PTFE") lined bottle attached to a Paasche VL0610 double action siphon feed airbrush (Paasche Airbrush Co., Chicago, Ill.). The airbrush was driven by an air-line with a regulator set to approximately 25 PSI. The tip, needle, and aircap used were model numbers VLT-1, VLN-1, and VLA-1, respectively (Paasche Airbrush Co.). Each aliquot was applied to one tube, in a sweeping motion, from end-to-end, while rotating the tube about its longitudinal axis to ensure full coverage. A consistent spray pattern was maintained by locking the line adjustment assembly to withdraw the pin of the airbrush to a fixed distance, and the airbrush was fixed at a distance of about 150 mm (5.9 inches) from the tube being coated. Samples were then left to dry under ambient conditions for a period of time, ranging from about 5 min to about 60 min. Drying was typically achieved in 5 min, however, for operational convenience, samples were left out for as long as 60 min.

Figure 4:
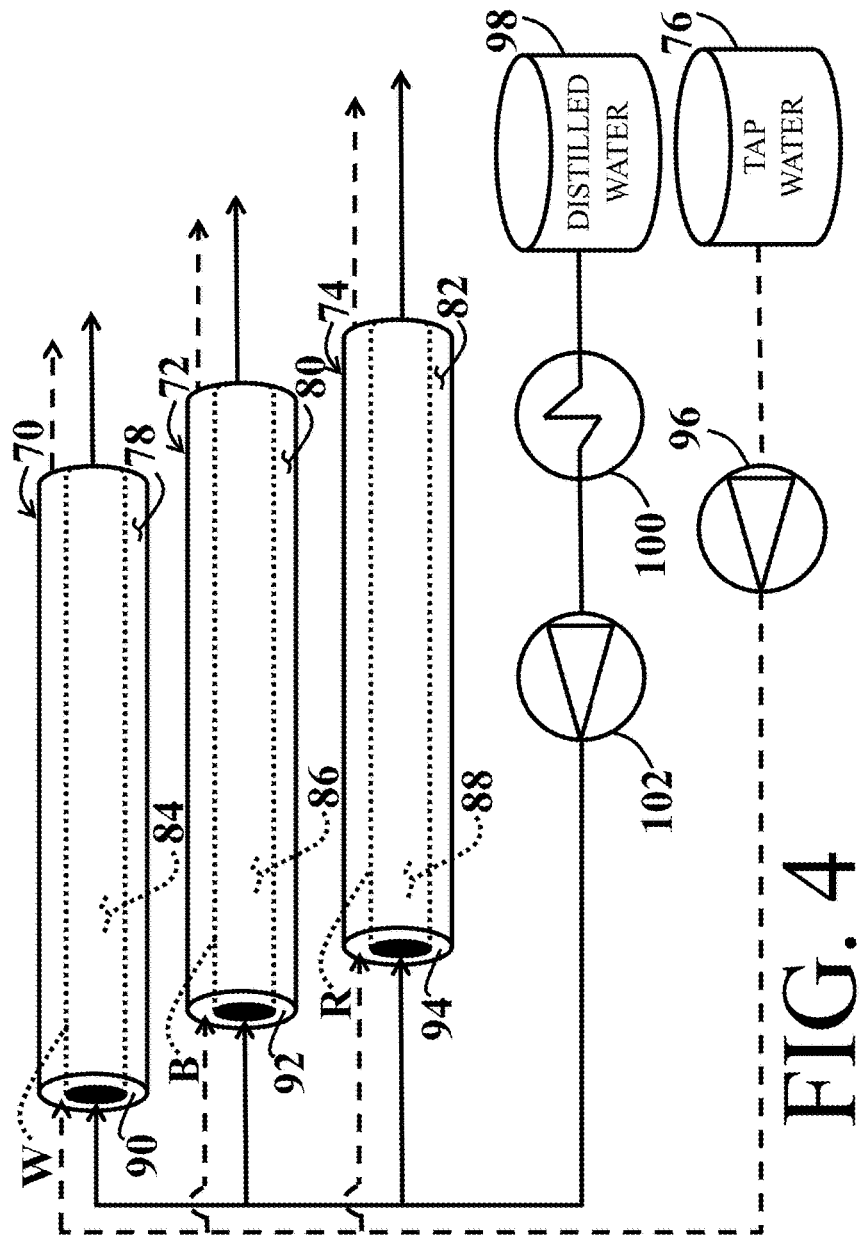
FIG. 4 is an apparatus used to test the self-release properties of pipes, as is discussed in Example 1.

As shown in FIG. 4, a total of three tubes were prepared. A first tube, designated as a "white" tube (and illustrated herein as "W"), was prepared as described above, but with no solid ingredients or liquid ingredients other than Asahiklin AK225G. A second tube, designated the "blue" tube (and illustrated herein as "B"), was prepared as described above, but using only octakis(1H,1H,2H,2H-nonafluorohexyl) polyhedral oligomeric silsesquioxane (F-hexyl-8-T8 POSS, with each $R_f$ group being 1H,1H,2H,2H-nonafluorohexyl) and Asahiklin AK225G as the ingredients. A third tube, designated the "red" tube (and illustrated herein as "R"), was prepared by applying a layer of Pro-Gray Primer 7582 (Rust-Oleum Corp, Vernon Hills, Ill.) to the third tube (directly from the manufacturers spay can), dried (per manufacturer directions), and then treated or coated with the solution having F-hexyl-8-T8 POSS as the ingredient (thus, similar to the B tube). Measurements indicated that a thickness of the Pro-Gray Primer was approximately 0.065 mm (0.0026 inches).

Each of the three tubes W, B, and R was mounted in a separate single-tube, tube-and-shell heat exchanger (70, 72, and 74, respectively). The heat exchangers were connected to a single water source 76. The shells of each heat exchanger (70, 72, 74) were made of transparent acrylic polymer to enable visual inspection and photography during testing. The test was conducted over a period of 46 hours and 5 minutes. During the test, 100 gallons of cold water were circulated by pump 96 between the outer surface of each tube (84, 86, 88) and the inner surface of each shell (78, 80, 82). The cold water was collected, without further treatment, from a municipal well within the Pittsburgh-Bodega, Calif. water district. The cold water was maintained at an average temperature of 70.8° F. and circulated at an average flow rate of about 6.54 gallons per minute (about 2.8 linear feet per second). Analysis of the cold water showed an initial pH of 8.03, electrical conductivity of $$1711 \frac{\mu s}{cm},$$

total dissolved solids at 1222 ppm, salinity at 1222 ppm, and calcium carbonate concentration at 420 ppm. The oil content of the cold water was negligibly small. The calcium carbonate concentration measured on a sample of the cold water approximately one day after start of the test was 440 ppm in a first measurement and 450 ppm in a second measurement. At conclusion, the cold water showed a pH of 8.18, electrical conductivity of $$1614 \frac{\mu s}{cm},$$

total dissolved solids of 1148 ppm, salinity of 1149 ppm, and calcium carbonate concentration of 370 ppm. The changes observed of the cold water from the start of testing to the end of testing are consistent with deposition of calcium carbonate (primarily) and, to a lesser extent, deposition of other minerals on the surfaces of the tubes.

While testing, distilled water (source 98) was heated in heater 100 (average temperature of 127.7° F.) and circulated through the interior of the three tubes (W, B, R) by pump 102 at a flow rate of 0.30 gallons per minute. Final weights of the tubes at completion of the testing are provided below in Table 1. Gross weight gains were similar for all three tubes and, on a per area basis, the weight gain was higher for the coated and/or treated second and third tubes (B and R, respectively) in contrast to the first tube (W) treated only with solvent. Despite the presence of the F-decyl POSS treatment, no significant reduction in weight gain was realized, which, at least facially, appears to be inconsistent with the expectations implied by the teachings of U.S. Application Publication No. 2013/0122225, entitled ARTICLES AND METHODS PROVIDING SCALE-PHOBIC SURFACES. While wishing to not be bound by any particular theory, in this case where the test environment may more accurately represent real world conditions with more nucleation events (as compared to a controlled laboratory environment), the effects observed in this study are consistent.

TABLE 1

| Tube Sample | Final Weight (g) | Weight Gain per Area $\left(\frac{g}{cm^2}\right)$ | Adhered thickness of mineral scale (mm) |
|---|---|---|---|
| $1^{st}$ Tube (W) | 67.656 | 0.0321 | 0.070 |
| $2^{nd}$ Tube (B) | 60.3514 | 0.0218 | 0.085 |
| $3^{rd}$ Tube (R) | 67.6572 | 0.0297 | 0.075 |

After completion of the test and subsequent drying of the three tubes under ambient conditions, the tubes were shipped to an analysis facility where the thickness of adhered mineral scale at multiple points along each tube was measured using digital calipers. Resultant values are provided in Table 1, above. These results indicate that while the mineral scale may have formed with a higher density on the second (B) and third (R) tubes, there was not a significantly large reduction in the amount of mineral scale adhered achieved by the F-decyl POSS treatments.

Figure 5:
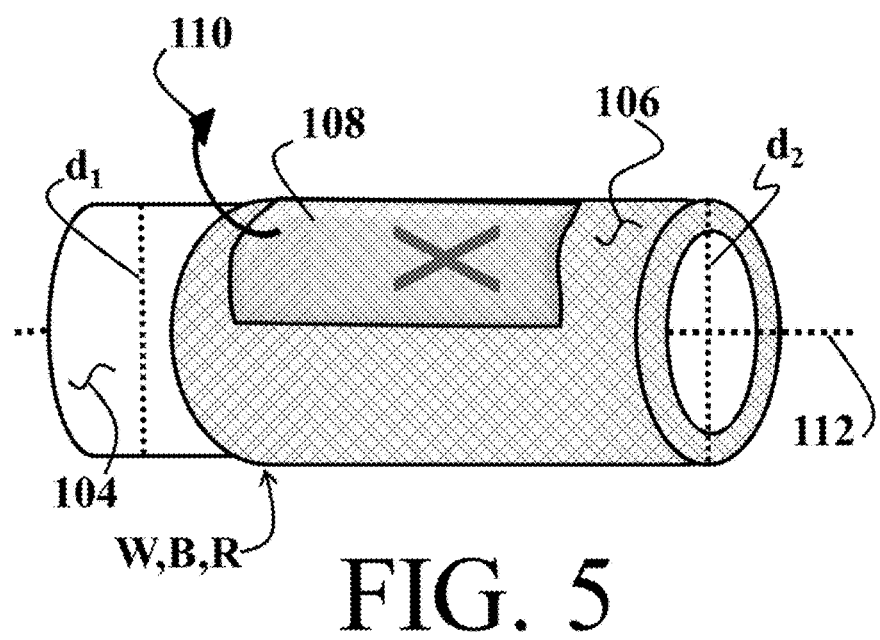
FIG. 5 is a side-elevational view of a substrate having an adhesive tape applied thereto for adhesion testing in accordance with the exemplary testing procedures.

Additional evaluation of the tubes after testing was conducted with a tape test adapted from AMERICAN SOCIETY FOR TESTING AND MATERIALS, "Method A," D3359-97 Measuring Adhesion by Tape Test. More particularly, and with reference to FIG. 5, the specific test procedure included measuring an internal diameter, $d_1$, of a bare portion 104 (that is, the area without mineral scale) of each stainless steel tube (W, B, R) using digital calipers in three locations and average recorded. A second diameter, $d_2$, of a section covered with mineral scale 106 was then measured for each tube (W, B, R) in three locations and average recorded. Two marks (one of the two is illustrated as "X") were inscribed on each tube 60, wherein each mark X is about 6 mm² and spaced away from the other mark (not shown) of the same tube (W, B, R) by a distance ranging from about 10 mm to about 20 mm. A first length of tape (not shown; Scotch® brand transparent tape by 3M Global Gateway, St. Paul, Minn.) is pulled to expose fresh adhesive from the reel and disposed. A second length of tape 108 is then pulled in the same manner and applied to the tube (W, B, R), over one of the two marks X and such that the tape 108 is centered over the mark X. The second length of tape 108 is pressed and smoothed on and around an area of the tube (W, B, R) over and proximate to the mark X. The second length of tape 108 is then removed by pulling with a quick movement in the direction of the arrow 110 and along the lengthwise central axis 112 of the mark X. The pulling angles are preferably close to 180°. While looking at the adhesive side of the tape, the amount of mineral scale deposit removed is evaluated according to Table 2, below. The process was repeated for both marks on each tube (W, B, R). Results are provided below in Table 3.

TABLE 2

| Rating | Description |
|---|---|
| 0 | Removal beyond the area of the X |
| 1 | Removal from most of the area of the X under the tape |
| 2 | Jagged removal along most of incisions on either side |
| 3 | Minor, jagged removal along incisions on either side |
| 4 | Trace peeling or removal along incisions or at their intersection |
| 5 | No peeling or removal |

TABLE 3

| Tube Sample | First Pull | Second Pull |
|---|---|---|
| 1st Tube (W) | 3 | 3 |
| 2nd Tube (B) | 0 | 0 |
| 3rd Tube (R) | 4 | 2 |

The mineral scale of the second tube (B), having only the F-decyl POSS treatment, was easily removed by the tape 108. In fact, the mineral scale of the second tube (B) delaminated with ordinary handling. The mineral scale of the first and third tubes (W, R) adhered fairly well. The difference in adhesion indicated that, at least for the unprimed second tube (B), the F-decyl POSS treatment remained present throughout and after the test. The surface energy of the F-decyl POSS layer used has been reported as $$11.6 \frac{mJ}{m^2}$$

according to the Girifalco-Good method taught in Chhatre et al., "Fluoroalkylated Silicon-Containing Surfaces-Estimate of Solid Surface Energy," *ACS Appl. Matl. Interfaces*, Vol. 2 (2010) 3544-3554. However, the results did not indicate a significant decrease in observed mineral scale accumulation or self-release properties. Moreover, as the data for the third tube (R) indicate, simple deposition of a low surface-energy material, such as F-decyl POSS, did not result in a treated surface with low adhesion. Again, without wishing to be bound by a particular theory, the heterogeneous and swellable nature of the primer layer is likely to have resulted in a heterogeneous distribution of F-decyl POSS on the surface, with some penetration of the primer by F-decyl POSS. The result is a broad distribution of surface energy characteristics. Under such conditions, the adhesion of mineral scale was not altered significantly.

Example 2

Three stainless steel tubes, from the same production lot as those of Example 1, were also coated or treated in the manner described in Example 1. A first tube (W) was treated with a solution having no solid ingredients or liquid ingredients, other than Asahiklin AK225G (similar to the first tube (W) of in Example 1). A second tube (B) was treated with a solution comprising a 4-to-1 weight ratio of poly (methyl methacrylate) (Part No. 182230-1KG, 9011-14-7, Sigma Aldrich Corp., St. Louis, Mo., having a molecular weight of about 120000, and $T_g$ of 99.0° C.) ("PMMA") to F-decyl POSS and no liquid ingredients other than Asahiklin AK225G. A third tube (R) was treated with a solution comprising a 7-to-3 weight ratio of PMMA to F-decyl POSS and no liquid ingredients other than Asahiklin AK225G.

As in the apparatus of FIG. 4, all three tubes (W, B, R) were mounted in separate single-tube tube-and-shell heat exchangers (70, 72, 74), which were connected to a single water source 76. The shell (78, 80, 82) on each heat exchanger (70, 72, 74) was made of transparent acrylic polymer to allow for visual inspection and photography during the test. The test was conducted over a period of 116 hours and 42 minutes. During the test, 100 gallons (25 gallons of which were freshly supplied) of cold water from water source 76 were circulated between the outer surface (84, 86, 88) of each tube (W, B, R) and the inner surface (90, 92, 94) of each shell (78, 80, 82). The cold water was collected, without further treatment, from a municipal well within the Pittsburgh-Bodega, Calif. water district. The cold water was maintained at an average temperature of 66.8° F. and circulated at an average flow rate of 6.41 gallons per minute (about 2.7 linear feet per second). The range of cold water flow rates recorded over the duration of the test extended from 5.93 gallons per minute to 6.94 gallons per minute. Analysis of the cold water showed an initial pH of 8.06, electrical conductivity of $$1644 \frac{\mu s}{cm},$$

total dissolved solids at 1172 ppm, salinity at 1172 ppm, and calcium carbonate concentration at 450 ppm. The oil content of the cold water was negligibly small. At conclusion, the cold water showed a pH of 8.27, electrical conductivity of $$1660 \frac{\mu s}{cm},$$

total dissolved solids of 1181 ppm, salinity of 1184 ppm, and calcium carbonate concentration of 410 ppm.

Figure 6:
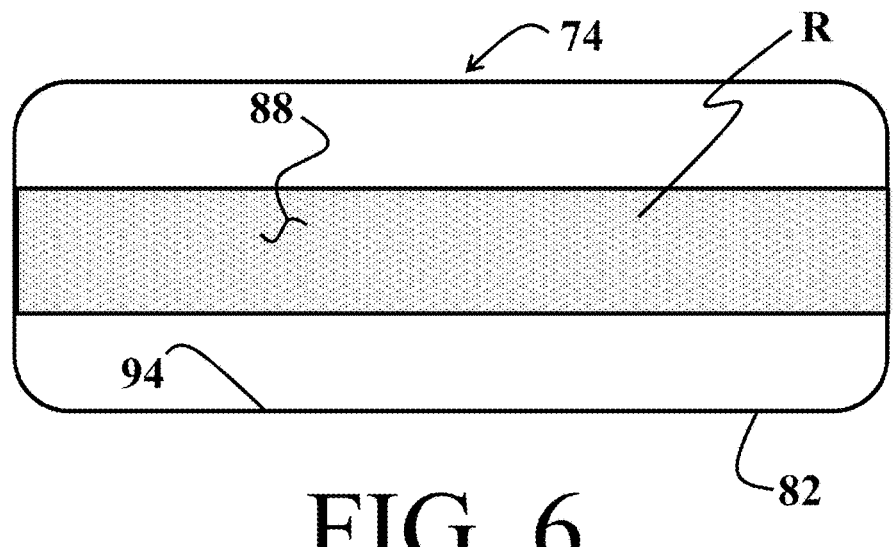
FIG. 6 is a photograph of a stainless steel tube treated or coated with a mixture of F-decyl POSS and poly(methyl methacrylate), i.e., the "blue" or B tube of Example 2, during operation of a test heat exchanger and showing self-release of mineral scale.
Figure 7:
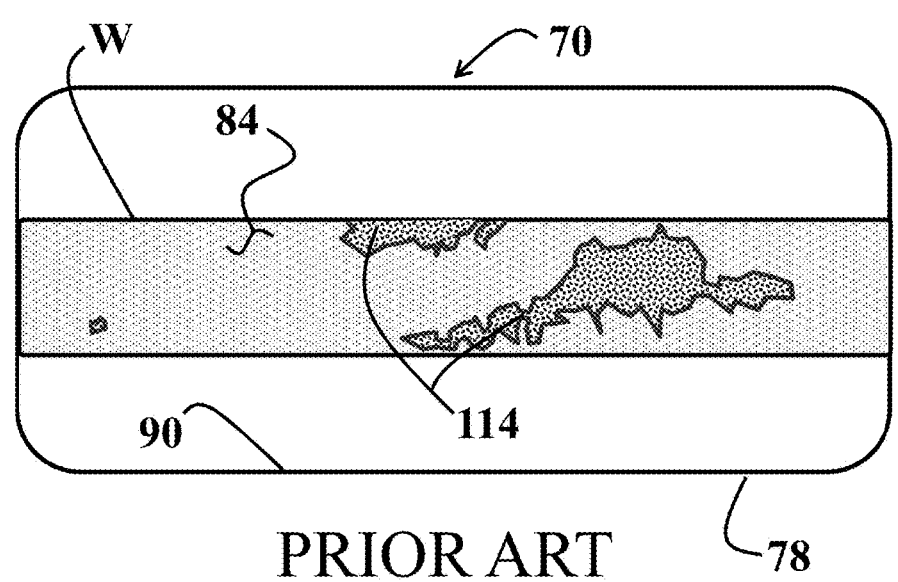
FIG. 7 is a photograph of a stainless steel tube treated with a control test composition containing Asahiklin AK225G, i.e., the "white" or W tube of Example 2, during operation of a test heat exchanger and, showing little-to-no self-release of mineral scale.

While testing, distilled water from water source 98 was heated by heater 100 to an average temperature of 128.4° F. and was circulated by pump 102 through the interior of the tubes (W, B, R) at a flow rate of 0.30 gallons per minute. Final weights of the tubes (W, B, R) at completion of the testing are provided below in Table 4. During testing, the third tube (R) demonstrated self-release of the mineral scale layer (FIG. 6). The second tube (B) demonstrated self-release, but to a lesser extent than the third tube (R). The first tube (W) did not exhibit self-release (FIG. 7)

TABLE 4

| Tube Sample | Final Weight (g) | Weight Gain per Area $\left(\frac{g}{cm^2}\right)$ | Adhered thickness of mineral scale (mm) |
|---|---|---|---|
| 1$^{st}$ Tube (W) | 66.7654 | 0.0114 | 0.020 |
| 2$^{nd}$ Tube (B) | 66.7182 | 0.0092 | 0.010 |
| 3$^{rd}$ Tube (R) | 59.4175 | 0.0066 | 0.000 |

Figure 8:
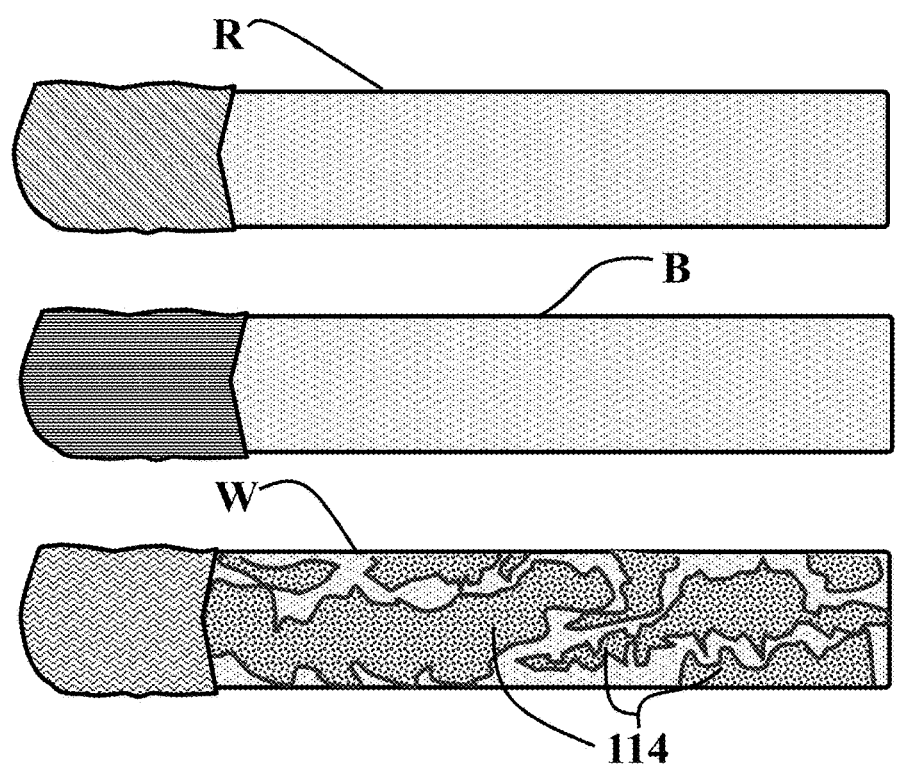
FIG. 8 is a photograph of three stainless steel tubes: the red tube (top, "R"), the blue tube (middle, "B"), and the white tube (bottom, "W"), prepared in accordance with Example 2, after the tubes are removed from a test heat exchanger.

After completion of the test and subsequent drying of the tubes (W, B, R) under ambient conditions, the tubes were shipped to an analysis facility. As shown in FIG. 8, the second tube (B) had almost no mineral scale left on its surface, the third tube (R) had only a small amount of mineral scale adhering thereto, and the first tube (W) had an intact layer of mineral scale. Adhesion testing of the mineral scale was performed as described above in Example 1. Both the second and third tubes (B, R) returned a value of "0" while the first tube returned a value of "5."

The thickness of mineral scale deposited on the first tube (W) was 0.02 mm. The mineral scale deposit on the third tube (R) had a thickness of 0.01 mm. The second tube (B) had insufficient mineral scale remaining to estimate a thickness.

Example 3

The following example illustrates the self-assembly of a fluorinated silsesquioxane contained in a thermoplastic matrix, and the influence of the self-assembly process on contact angle characteristics of a surface. In accordance with the teaching of Meuler (supra), the receding contact angle indicates the strength of adhesion of a solid substrate to the surface. Because the solid in question is a hydrated salt solution, the best common liquid probe used to indicate the likely adhesion strength is water. (The temperatures required of a molten salt probe liquid are not practical for analysis of the surfaces in question.)

Figure 9A:
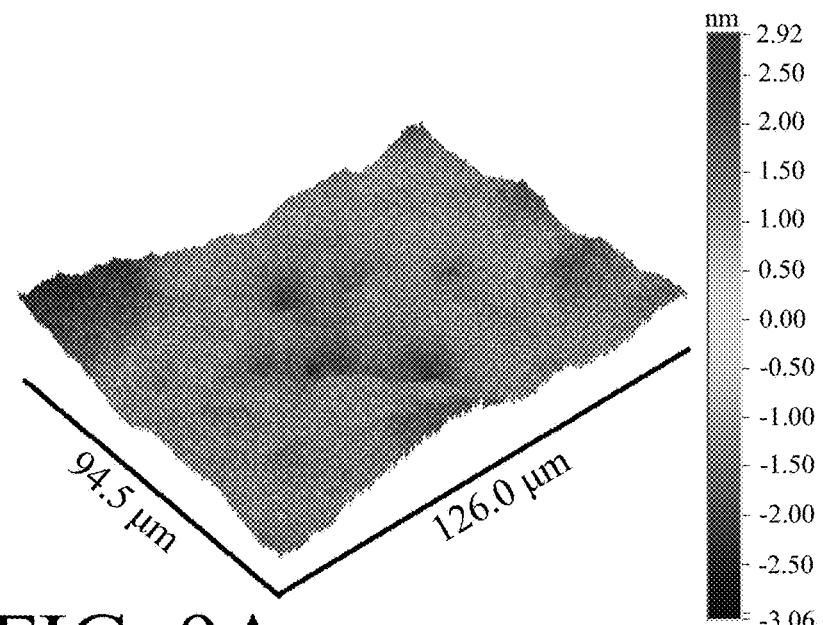
FIGS. 9A and 9B are a set of comparative surface topographic maps in which a spin-coated mixture of octakis(1H,1H,2H,2H-heptadecafluorodecyl) silsesquioxane, and poly(methyl methacrylate), deposited from Asahiklin AK225G solvent, is shown before and after heat treatment at 90° C. for 1 hour.
Figure 9B:
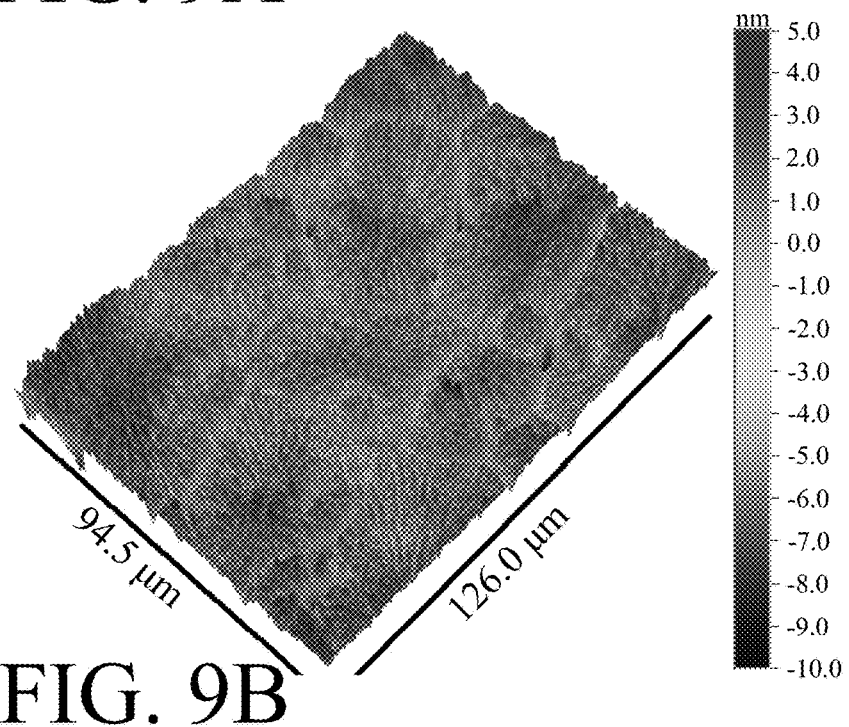

Using octakis(1H,1H,2H,2H-heptadecafluorodecyl)silsesquioxane as the anti-adhesive agent, poly(methyl methacrylate) as the matrix thermoplastic, Asahiklin AK225G as the solvent, and a ratio of 20:80 of anti-adhesive agent to thermoplastic, surfaces were prepared by spin coating the aforementioned solution (30 mg/mL total solids content) onto clean silicon wafers. The geometric characteristics of the surfaces were analyzed using a surface interferometer (Vecco Instruments, Inc., Plainwell, N.Y.) to obtain topographical maps of regions on the surface, as presented in FIG. 9. A Rame-Hart goniometer was then used to collect advancing and receding contact angle characteristics of the surfaces, using pure water as a probe liquid, with the results shown below in Table 5. The same surfaces were then heated for 1 hour at a temperature of 90° C., about 10° C. below the glass transition temperature of the thermoplastic matrix. At 90° C., the thermoplastic matrix allows for a rapid annealing of the surface texture. As indicated in FIG. 9 (upper panel), the surface prior to heating at 90° C. is extremely smooth (having an average roughness, $R_q$, below 1 nm) and generally featureless, exhibiting only some modest curvature and undulation over length scales of tens of microns. This result indicates that the roughness of the surface may be made smaller than 1 nm using the coating compositions and procedures specified in the invention. In other examples, the roughness of the surface may be adjusted between 1 nm and about 1 μm by changing variables such as the drying time and temperature, as understood by one skilled in the art.

In contrast, the surface after heat treatment (FIG. 9, lower panel) exhibits a texture dominated by well-formed crystalline domains of the fluorinated silsesquioxane. At the boundaries of these domains (indicated by the bright lines in FIG. 9, lower panel), the surface contains nanoscale crevice-like features. Within these crevices, the thermoplastic matrix exhibits a low level of fluorinated silsesquioxane, and therefore lacks anti-adhesive properties. As a result, these features serve as surface defects where solids and liquids can become pinned to the surface. The effect is manifest in the contact angle data shown below in Table 5. The defects created by the heat treatment process lower the receding contact angle and are therefore likely to increase the adhesion of mineral scale. To avoid the formation of such defects, the skilled artisan must select a matrix thermoplastic with a glass transition temperature at least 20° C., and preferably at least 30° C., above the intended use temperature.

TABLE 5

|  | Advancing Contact Angle (degrees) | Uncertainty (degrees) | Receding Contact Angle (degrees) | Uncertainty (degrees) | $R_q$ (nm) |
| --- | --- | --- | --- | --- | --- |
| No heat treatment | 117 | 0.20 | 104 | 0.40 |  |
|  | 118 | 0.24 | 107 | 0.40 |  |
| Average | 118 | 0.31 | 106 | 0.57 | 0.77 |
| With heat treatment | 115 | 0.24 | 88 | 1.00 |  |
|  | 117 | 0.27 | 95 | 0.72 |  |
| Average | 116 | 0.36 | 91 | 1.23 | 1.66 |

Example 4

The following example illustrates that the physical characteristics of the thermoplastic matrix, as controlled by factors such as the coating deposition process, influence the self-assembly of a fluorinated silsesquioxane in such a way as to affect the adhesion of solid objects to a surface of a coating comprising the thermoplastic matrix and the silsesquioxane.

Figure 10:
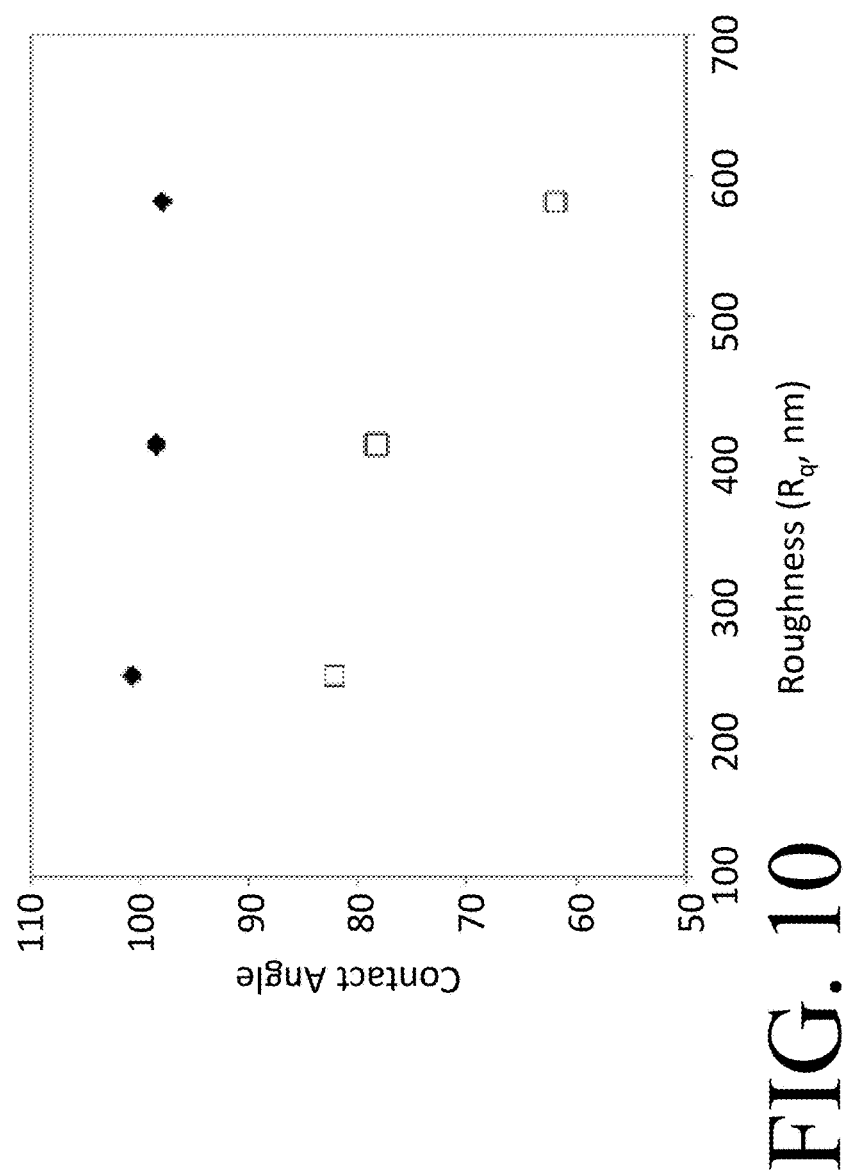
FIG. 10 is a plot of advancing and receding contact angles for dip-coated surfaces containing a mixture of octakis(1H,1H,2H,2H-heptadecafluorodecyl) silsesquioxane, and poly(methyl methacrylate), deposited from Asahiklin AK225G solvent, as a function of surface roughness.

Using octakis(1H,1H,2H,2H-heptadecafluorodecyl)silsesquioxane as the anti-adhesive agent, poly(methyl methacrylate) as the matrix thermoplastic, Asahiklin AK225G as the solvent, and a ratio of 20:80 of anti-adhesive agent to thermoplastic, surfaces were prepared by dip coating stainless steel tubes in the aforementioned solutions (30 mg/mL total solids loading). By adjusting the speed of tube withdrawal from the dip coating process, coating with differing roughness values were obtained. The roughness of the coatings was quantified using a surface interferometer (Veeco Instruments, Inc., Plainwell, N.Y.), using the parameter $R_q$ as the quantitative roughness indicator. Advancing and receding contact angles were then measured using a Rame-Hart goniometer and pure water as the probe liquid. FIG. 10 shows a plot of the advancing and receding contact angles as a function of the roughness parameter $R_q$. In particular, the receding contact angle decreases markedly as the roughness increases. Such behavior is a well-known characteristic of the fully-wetted state of rough surfaces. Because the receding contact angle indicates the relative adhesion strength of hydrated salts to the surface, FIG. 10 indicates that the adhesion strength will decrease as the roughness of the surface is decreased. To obtain self-release of adhered mineral deposits, the surface roughness must therefore be maintained below a critical value. The particular critical value depends on the magnitude of the forces generated by the fluid flow and the nature of the mineral scale, as understood by those skilled in the art.

Example 5

The following example illustrates that not all fluorine containing substances that form a coating on a surface, and in particular not perfluorinated substances that have previously been identified as reducing the extent of mineral scale deposit on a surface, are suitable for the present invention. As previously mentioned, the receding contact angle of the surface in contact with pure water serves as a reliable indicator of the relative strength of adhesion of hydrated mineral scale. Table 6 lists the receding contact angles in contact with pure water of surfaces prepared by dip coating stainless steel 316 tubes in solutions containing fluorinated substances. In particular, several grades of the commercial product Fluorolink, including Fluorolink S10, were used as described in U.S. Pat. App. Pub. No. 2013/1260156. The receding contact angles of these coatings were measured using a Rame-Hart goniometer.

According to Table 6, the receding contact angles of the Fluorolink products were very substantially lower than those of an appropriately selected fluorinated silsesquioxane compound within an appropriately selected thermoplastic matrix. From this, it follows that the adhesion of mineral fouling will likely be significantly higher for surfaces composed of perfluorinated compounds such as Fluorolink S10, as compared with the terminal fluorous surfaces of the present invention.

TABLE 6

|  | $CA_{adv}$ | stdev | $CA_{rec}$ | stdev | hist | stdev |
|---|---|---|---|---|---|---|
| Fluorolink P54 | 107.5 | 1.44 | 0.0 | 0.00 | 107.5 | 1.44 |
| Fluorolink S10 | 107.5 | 0.27 | 63.0 | 0.61 | 44.5 | 0.66 |
| FD-POSS: PMMA | 121.0 | 0.50 | 94.0 | 0.43 | 27.0 | 0.66 |

Example 6

This example illustrates that the self-release phenomenon depends on the level of shear forces applied to a surface. For embodiments of the present invention, there will be a critical threshold value of shear forces above which self-release will take place. This level depends on the surface composition, state of physical assembly of the molecules at the surface, surface topography, and surface homogeneity.

Figure 11:
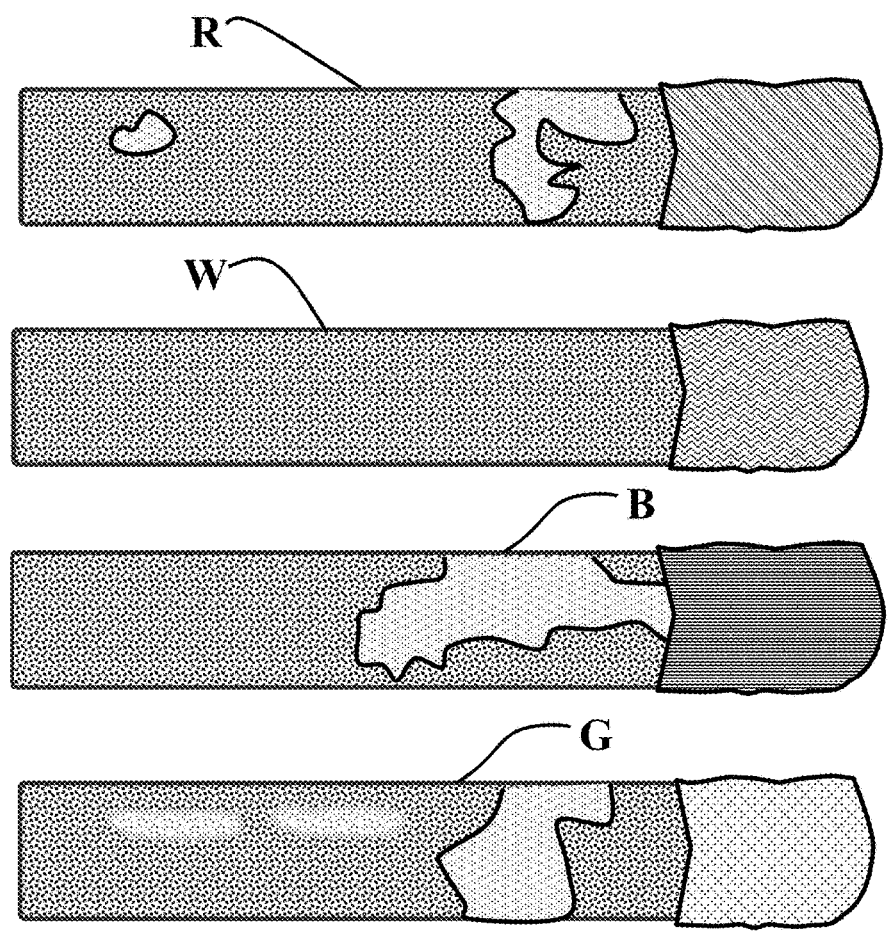
FIG. 11 shows an example photograph of four stainless steel tubes: the red tube (top, "R"), white tube (second from top, "W"), the blue tube (second from bottom, "B"), and the green tube (bottom, "G"). Regions of localized, high shear forces have caused self-release of mineral fouling from surfaces containing a mixture of octakis(1H,1H,2H,2H-heptadecafluorodecyl) silsesquioxane, and poly(methyl methacrylate), deposited from Asahiklin AK225G solvent, but no self-release in the same location from a control surface containing neither the silsesquioxane nor the poly(methyl methacrylate).

In FIG. 11, multiple examples are shown of surfaces comprising a mixture of octakis(1H,1H,2H,2H-heptadecafluorodecyl) silsesquioxane, and poly(methyl methacrylate), deposited from Asahiklin AK225G solvent via dip coating of stainless steel tubes and exposed to hard water solutions. Specifically, the tubes having the B and R labels (i.e., other than W) contain such surfaces, while the tube having the white tape label is a control sample having only the stainless steel substrate after dip coating in solvent only. The experiments were carried out with the procedures as described in Examples 1 and 2. Within the experimental apparatus, there exist differing levels of shear forces present on the surfaces. In particular, there are localized areas near the ends of the coated tubes where redirection of the fluid flow takes place. Such redirection of flow creates a localized zone of high shear forces acting on the surface of the tube. Because the surfaces of the present invention require a critical threshold value of shear force to produce delamination, it is possible to observe cases where only in the localized regions of flow redirection are the shear forces sufficient to cause self-release. Such a phenomenon constitutes an important experimental verification of the mechanism of self-release, namely, that self-release is not associated with defects in the coating (which would produce random locations of self-release). Moreover, self-release is not caused by any features of the apparatus itself (such as a cold spot), because mineral scale does form on the control sample not having the surface of the present invention.

As described herein, embodiments of the present invention are directed to a self-release coating or treatment consisting of a thermoplastic and a fluorinated polyhedral oligomeric silsesquioxane. Exemplary data demonstrate that substrates treated or coated in accordance with embodiments of the present invention have decreased weight and decreased thickness of mineral scale as compared to similar substrates lacking the coating or treatment.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of preparing a self-release substrate, the method comprising:
    applying a first plurality of layers to a surface of a substrate, each layer of the first plurality comprising a —$CF_3$ terminal fluorous polyhedral oligomeric silsesquioxane;
    applying a second plurality of layers to the surface of the substrate, each layer of the second plurality comprising an amorphous thermoplastic; and
    drying the first and second pluralities of layers,
    wherein the drying step and a ratio of the —$CF_3$ terminal fluorous polyhedral oligomeric silsesquioxane to the amorphous thermoplastic permit segregation and self-assembly of the —$CF_3$ terminal fluorous groups and resist crystallization and cross-linking.

2. The method of claim 1, wherein the first plurality of layers is applied before applying the second plurality of layers.

3. The method of claim 1, further comprising:
    sequentially drying the applied layer of the first or second pluralities before applying the next layer of the first or second pluralities.

4. The method of claim 1, further comprising:
    applying an additive layer to the surface of the substrate, wherein the additive layer is configured to impart a surface energy of less than about 15 $mJ/m^2$.

5. The method of claim 4, wherein the additive layer comprises a —$CF_3$ terminal fluorous compound.

6. The method of claim 1, further comprising:
    applying a third plurality of layers to the surface of the substrate.

7. The method of claim 6, wherein each layer of the third plurality comprises an additive configured to impart a surface energy of less than about 15 $mJ/m^2$.

8. The method of claim 7, wherein the additive of the third plurality of layers comprises a —$CF_3$ terminal fluorous compound.

9. The method of claim 6, wherein each layer of the third plurality comprises a polyhedral oligomeric silsesquioxane.

10. The method of claim 1, further comprising:
    cleaning the surface of the substrate before applying any layer of the first or second pluralities thereto.

11. The method of claim 10, wherein cleaning the surface of the substrate comprises a step selected form the group consisting of applying a surfactant, applying an alcohol, applying an aromatic solvent, applying a functional organic solvent, plasma etching, flame exposure, acid etching, and electrical arc exposure.

12. The method of claim 1, wherein applying the first plurality of layers, the second plurality of layers, or both, are separately selected from the group consisting of spraying, dip coating, web coating, roll coating, electrodeposition, vapor deposition, and implantation.

13. The method of claim 1, wherein layers of the second plurality are subsequently and sequentially applied after each layer of the first plurality.

14. The method of claim 1, wherein layers of the first plurality are subsequently and sequentially applied after each layer of the second plurality.

15. The method of claim 1, wherein two layers of the first plurality are applied before applying any layer of the second plurality.

16. The method of claim 1, wherein two layers of the second plurality are applied before applying any layer of the first plurality.

17. The method of claim 1, wherein the amorphous thermoplastic comprises less than about 5% (w/w) of groups imparting water solubility, is not swelled more than about 10% by water, and that comprises at most about 20% (w/w) fluorine.

18. The method of claim 1, wherein a glass transition temperature of the amorphous thermoplastic is at least 20° C. higher than an intended use temperature of the self-release substrate.

19. The method of claim 1, further comprising:
resisting an ingress of water while drying the first and second pluralities of layers.

20. A method of preparing a self-release substrate, the method comprising:
selecting a —$CF_3$ terminal fluorous polyhedral oligomeric silsesquioxane and an amorphous thermoplastic;
applying a first plurality of layers to a surface of a substrate, each layer of the first plurality comprising the —$CF_3$ terminal fluorous polyhedral oligomeric silsesquioxane;
applying a second plurality of layers to the surface of the substrate, each layer of the second plurality comprising the amorphous thermoplastic; and
drying the first and second pluralities of layers,
wherein the selection of the —$CF_3$ terminal fluorous polyhedral oligomeric silsesquioxane and the amorphous thermoplastic permits segregation and self-assembly of the —$CF_3$ terminal fluorous groups and resists crystallization and cross-linking.

* * * * *